US010223084B1

(12) United States Patent
Dunn (10) Patent No.: US 10,223,084 B1
(45) Date of Patent: Mar. 5, 2019

(54) QUANTUM COMPILER

(71) Applicant: Lockheed Martin Corporation, Bethesda, MD (US)

(72) Inventor: Robert Andrew Dunn, Exton, PA (US)

(73) Assignee: Lockheed Martin Corporation, Bethesda, MD (US)

( * ) Notice: Subject to any disclaimer, the term of this patent is extended or adjusted under 35 U.S.C. 154(b) by 33 days.

(21) Appl. No.: 15/380,681

(22) Filed: Dec. 15, 2016

(51) Int. Cl.
*G06F 8/41* (2018.01)
*G06N 99/00* (2010.01)

(52) U.S. Cl.
CPC ............. *G06F 8/41* (2013.01); *G06N 99/002* (2013.01)

(58) Field of Classification Search
USPC ........................................................ 717/140
See application file for complete search history.

(56) References Cited

U.S. PATENT DOCUMENTS

| | | | | |
|---|---|---|---|---|
| 2003/0121028 A1* | 6/2003 | Coury | ................... | B82Y 10/00 717/138 |
| 2007/0162262 A1* | 7/2007 | Tucci | ................... | B82Y 10/00 703/1 |
| 2011/0238378 A1* | 9/2011 | Allen | ................... | B82Y 10/00 702/186 |
| 2015/0106418 A1* | 4/2015 | Kliuchnikov | ........ | G06N 99/002 708/520 |
| 2016/0171368 A1* | 6/2016 | Aspuru-Guzik | ..... | G06N 99/002 706/46 |
| 2017/0194930 A1* | 7/2017 | Wiebe | ................... | B82Y 10/00 |
| 2017/0308803 A1* | 10/2017 | Wallman | .............. | G06N 99/002 |

OTHER PUBLICATIONS

Privman, "Hamiltonians for Quantum Computing", 1997, Proc. Conf. Photonic Quantum Computing, AeroSense 97, SPIE Proc. vol. 3076, 84-96 (1997). (Year: 1997).*

* cited by examiner

*Primary Examiner* — Hossain M Morshed
(74) *Attorney, Agent, or Firm* — Morgan, Lewis & Bockius LLP (57) ABSTRACT

A quantum compiler is provided. The quantum compiler may generate, based on a text-based programmer input, an executable Hamiltonian for a quantum computer such as a quantum annealing computer or an adiabatic quantum computer. The quantum compiler may generate the program Hamiltonian by generating Hamiltonian phrases corresponding to portions of the programmer input and combining the Hamiltonian phrases. Various terms and values in the program Hamiltonian may correspond to physical features of the quantum computer so that the quantum computer can be operated, based on the program Hamiltonian, such that a low energy state of the quantum computer corresponds to the low energy state of the Hamiltonian.

12 Claims, 5 Drawing Sheets

QUANTUM COMPILER

STATEMENT REGARDING FEDERALLY SPONSORED RESEARCH OR DEVELOPMENT

Not applicable.

FIELD

The disclosure relates in general to quantum computing, and in particular to, for example, without limitation, a compiler for a quantum computer.

BACKGROUND

The description provided in the background section, including without limitation, any problems, features, solutions or information, should not be assumed to be prior art merely because it is mentioned in or associated with the background section. The background section may include information that describes one or more aspects of the subject technology.

Digital computers are typically operated based on binary instructions and data. The generation of binary instructions and data for digital computers is typically performed by compilers that translate programming language text, which nominally includes text-based specification of data and functionality and optional supporting files, into lower-level sequential instructions and data for a targeted digital computing platform. However, existing programming languages and compilers are not suitable for quantum computing systems such as quantum annealing (QA) systems and adiabatic quantum computers (AQCs) systems because QA and AQC systems do not implement digital instructions and do not perform sequential operations.

SUMMARY

The description in this summary section may provide some illustrative examples of the disclosure. This section is not intended to be a broad overview or to identify essential elements of the disclosure.

The behavior of Quantum Annealing (QA) systems and Adiabatic Quantum Computers (AQCs) is driven by the creation of a custom Hamiltonian function describing the total energy of the system based on the states of quantum bits (qubits), weighting coefficients for the quantum bits, and weighting coefficients and operators for multi-qubit interaction terms. One example of an AQC is the D-Wave™ quantum annealer available from D-Wave Systems Inc. of Burnaby, British Columbia, Canada. Unlike digital computers, in which programs are created as a series of predefined sequential instructions and binary data, programming quantum computers such as QA and AQC devices consists of creating a Hamiltonian that describes the problem of interest in such a way that the ground eigenstate of the final Hamiltonian is a qubit pattern representing the desired solution. By slowly altering the active Hamiltonian of the quantum computer to the problem-specific Hamiltonian, sometimes referred to herein as a program Hamiltonian, the quantum computer will statistically reach the ground eigenstate for the problem.

Unlike conventional digital computers, where programming languages to assist in the creation of software have been available for a half-century, there has not been a corresponding programming language or compiler for quantum computers such as QA and AQC systems due to the unusual and recently discovered nature by which these systems operate.

Therefore, in accordance with some embodiments, a quantum compiler is provided that generates a Hamiltonian, executable by a specific quantum computer, based on a text-based input received from a user in a quantum programming language.

In one or more implementations, a quantum compiler is provided that includes memory and processing circuitry communicatively coupled to the memory. The processing circuitry receives a text-based input from a user, the text-based input including code for a quantum computer, and generates a program Hamiltonian that is executable by the quantum computer, based on the text-based input.

In one or more implementations, a quantum computing system is provided that includes a quantum computer and a quantum compiler. The quantum compiler includes memory and processing circuitry communicatively coupled to the memory. The processing circuitry receives a text-based input from a user, the text-based input including code for the quantum computer, generates a program Hamiltonian that is executable by the quantum computer based on the text-based input, and provides the program Hamiltonian to the quantum computer.

In one or more implementations, a method is provided that includes receiving, at a quantum compiler, a text-based input for a quantum program for a quantum computer, and generating, with the quantum compiler, a program Hamiltonian based on the text-based input.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

In accordance with various aspects of the subject disclosure, a quantum compiler, along with an associated programming language, are provided that support data input by a programmer to allow instance-specific parameter settings for a quantum program to be executed by a quantum computer (e.g., one of one or more supported quantum computing platforms), compiler output to allow execution by the quantum computer, and specification of functionality to define the required execution by the quantum computer.

Figure 1:
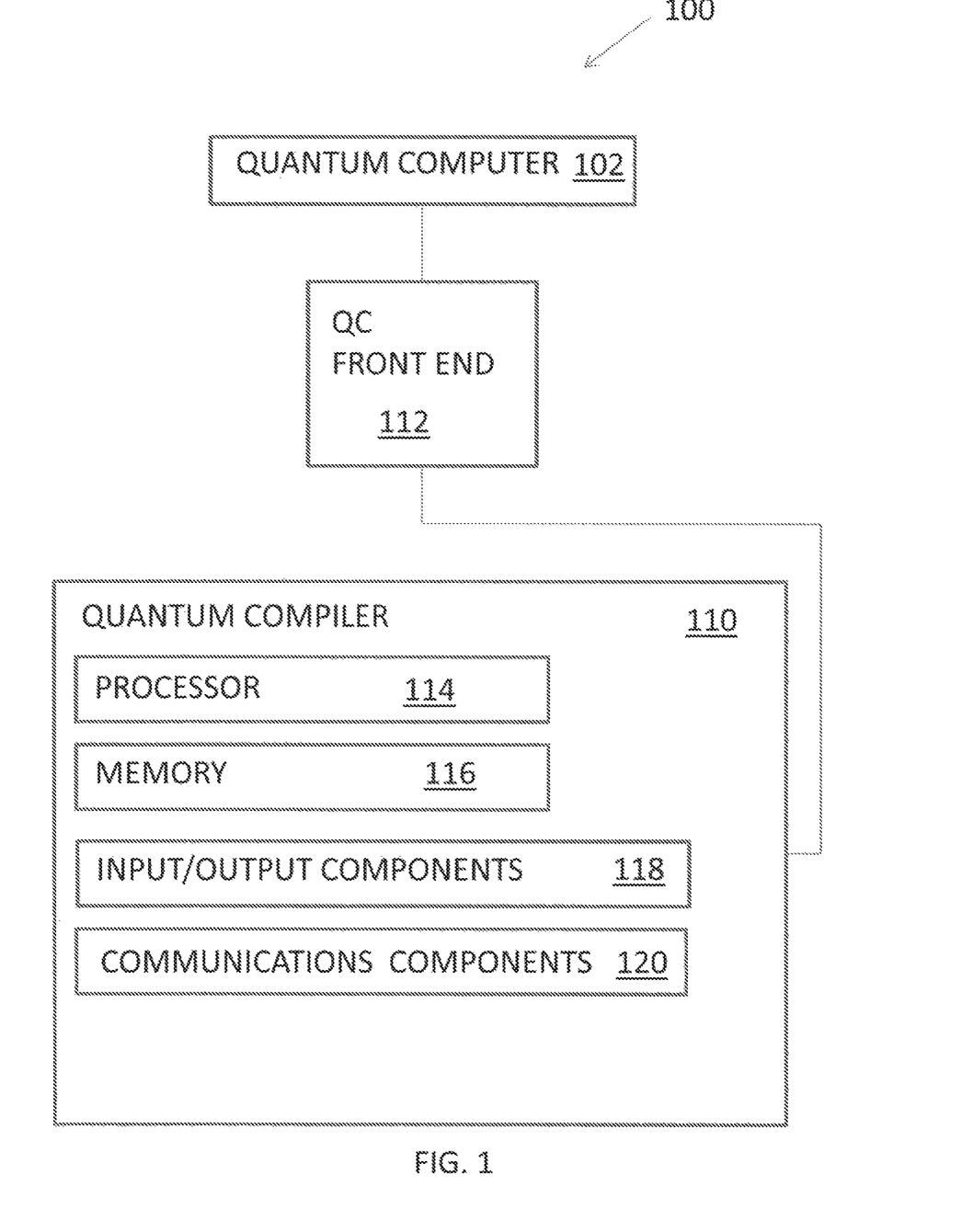
FIG. 1 illustrates a block diagram of an example of a quantum computing system in accordance with certain aspects of the disclosure.

FIG. 1 shows an exemplary quantum computing system having a quantum compiler, in accordance with various aspects of the subject disclosure. As shown in FIG. 1, quantum computing system 100 may include quantum computer 102, quantum computing (QC) front end 112, and quantum compiler 110. Quantum computer 102 may include a quantum processor that executes a quantum program in the form of a Hamiltonian that is generated by quantum compiler 110 based on text-based input (e.g., human readable or quasi human readable text) from a programmer.

QC front end 112 may include memory and one or more processors that receive a Hamiltonian generated by quantum compiler 110 and operate interface circuitry of quantum computer 102 to apply input fields and/or currents to junctions and/or couplers of quantum computer 102 to map various weights and variable values of the Hamiltonian to the physical structures of a quantum processor of quantum computer 102.

As shown in FIG. 1, quantum compiler 110 includes processor 114, memory 116, input/output component 118, and communications components 120. Processor 114 may include classical processing circuitry such as one or more microprocessors, multi-core processors, and/or one or more integrated circuits, such as application specific integrated circuits (ASICs) or field-programmable gate arrays (FPGAs) that load and execute sequences of instructions, software modules, etc. Processor 114 may execute instructions stored in memory 116. In some implementations, such integrated circuits execute instructions that are stored on the circuit itself.

Memory 116 may include classical computer-readable media such as RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. Memory 116 includes addressable semiconductor-based bi-stable memory cells that can be controlled to store sets of instructions/code that are executable by processor 114 including sets of instructions/code that implement the quantum compiler processes described herein. Examples of computer programs or computer code include machine code, such as is produced by a compiler, and files including higher-level code that are executed by a computer, an electronic component, or a microprocessor using an interpreter.

Input/output components 118 include one or more input components for receiving input from a user such as a programmer and one or more output components for providing output to the user. For example, input components may include a keyboard, a touch screen, a mouse, a microphone, a touchpad, or other suitable components for receiving input from a user. For example, output components may include a display, one or more speakers, or the like.

Communications components 120 may include transceiver circuitry, signal processing circuitry, signal generation circuitry, and/or other communications circuitry for communicatively coupling quantum compiler to quantum computer 102 and/or QC front end 112 (e.g., via a network of computers such as a local area network ("LAN"), a wide area network ("WAN"), or an Intranet, or a network of networks, such as the Internet as would be understood by one skilled in the art).

Processor 114, memory 116, input/output components 118, communications components 120, and/or other components of quantum compiler 110 may be communicatively connected by a system bus (not shown) that includes system, peripheral, and chipset buses that communicatively connect the numerous internal devices and components of quantum compiler 110 as would be understood by one skilled in the art. For instance, a bus may be provided that communicatively connects processor 114, memory 116, input/output components 118, communications components 120.

Processor 114 and memory 116 may be formed from traditional, classical computing components such as silicon-based components that include p-type and/or n-type metal oxide semiconductor field effect transistors for storing information and/or performing logic functions as would be understood by one skilled in the art.

Figure 2:
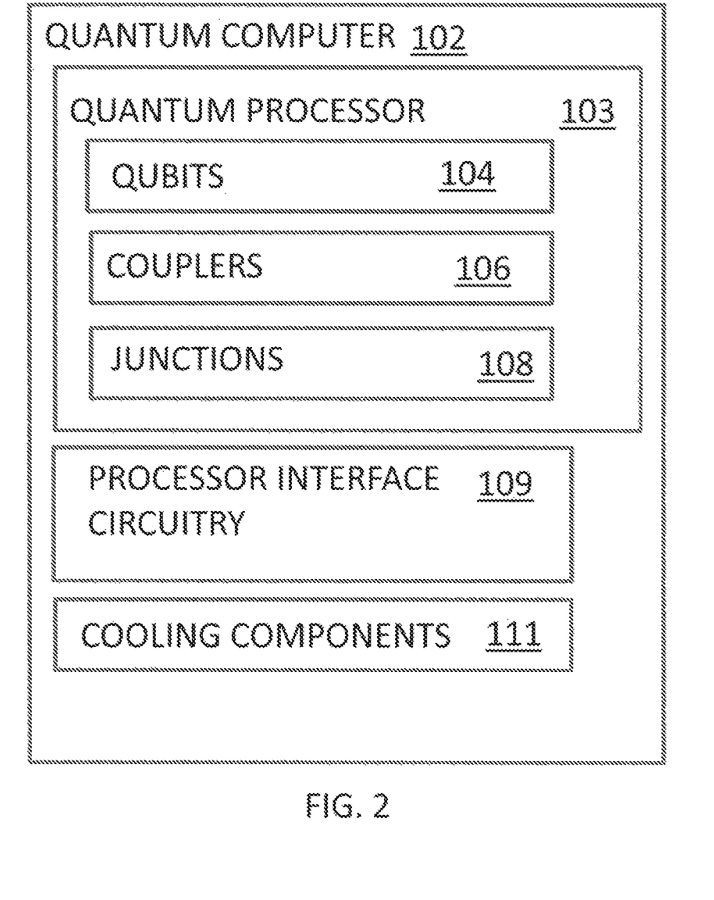
FIG. 2 illustrates a block diagram of an example of a quantum computer in accordance with certain aspects of the disclosure.

In contrast, quantum computer 102 may include a quantum processor formed from, for example, superconducting qubits or other quantum bits. FIG. 2 illustrates a block diagram of an exemplary implementation of quantum computer 102. As shown in FIG. 2, quantum computer 102 may be implemented as an adiabatic quantum computer (AQC) that includes quantum processor 103, processor interface circuitry 109, and cooling components 111. Quantum processor 103, in the implementation of FIG. 2, includes quantum bits (qubits) 104, couplers 106, and junctions 108 (e.g., Josephson junctions). Qubits 104 may, for example, be conductive loops (e.g., niobium loops) that become superconducting loops when cooled by cooling components 111 (e.g., by thermally coupling a cooling material such as liquid Helium to the conductive loops).

QC front end 112 (FIG. 1) may operate processor interface circuitry 109 to apply weights and coupling strengths (e.g., at couplers 106 and junctions 108), based on a received Hamiltonian in which the minimum energy state is the desired output of the quantum processor. Quantum processor 103 may then be allowed to adiabatically settle to the minimum energy state, following which, the output can be read out by processor interface circuitry 109.

Processor interface circuitry 109 may include control lines, wire bonded or otherwise conductively coupled to qubits 104, couplers 106, and/or junctions 108, and operable to apply desired fields (e.g., magnetic fields) and/or currents thereto. Processor interface circuitry 109 may also include readout circuits coupled to qubits 104 for reading out the final values of the qubits following execution of the quantum program.

Figure 3:
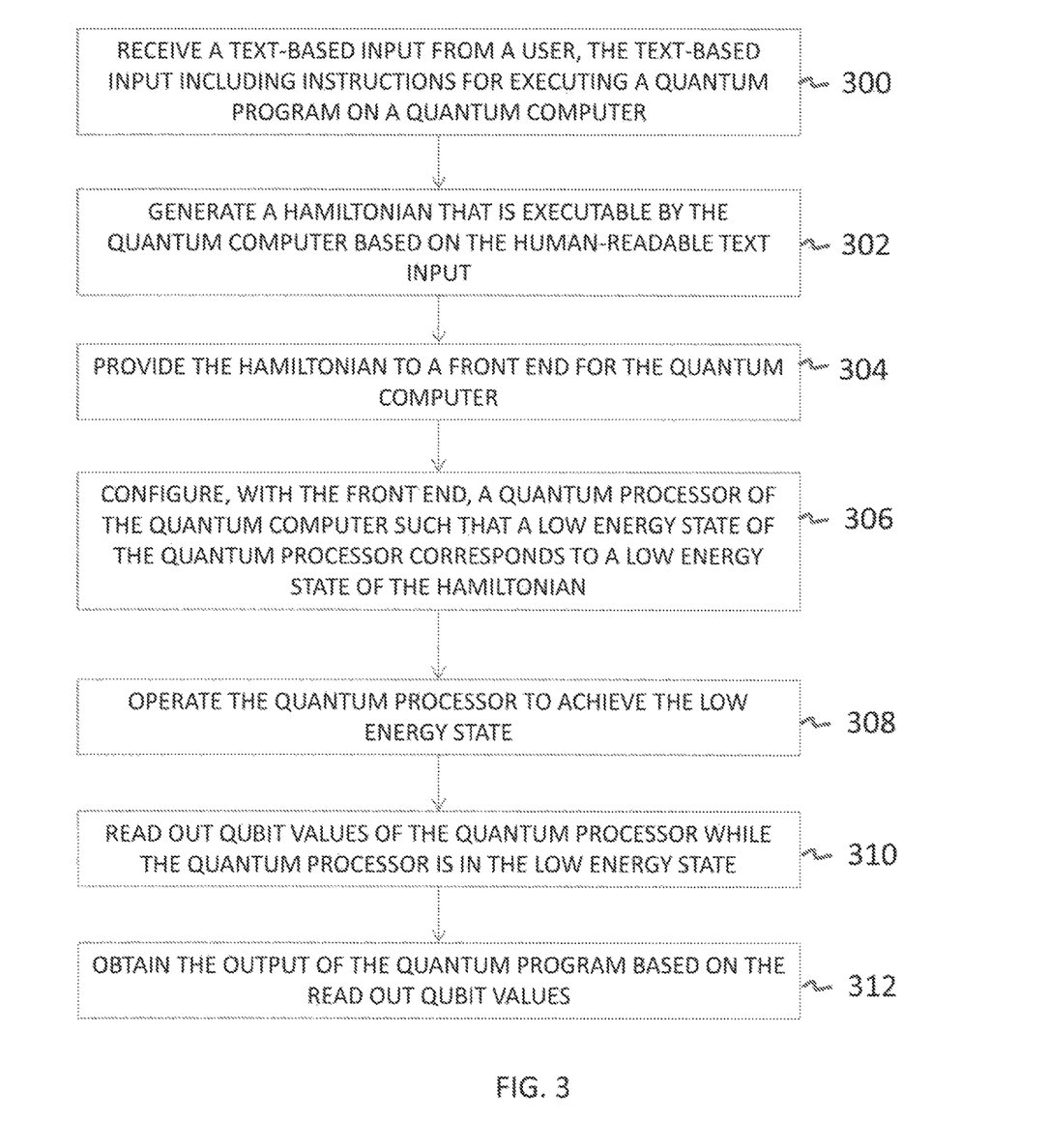
FIG. 3 is a flow chart showing an illustrative process for quantum compilation and computing in accordance with certain aspects of the disclosure.

FIG. 3 depicts a flow diagram of an example process for programming and operating a quantum computer such as quantum computer 102, according to various aspects of the subject technology. For explanatory purposes, the various blocks of the example process of FIG. 3 are described herein with reference to the components and/or processes described herein. One or more of the blocks of the example process of FIG. 3 may be implemented, for example, by one or more processors, including, for example, processor 114 of FIG. 1 or one or more components or processors of quantum compiler 110. One or more of the blocks of the example process of FIG. 3 may be implemented, for example, by one or more components or processors of QC front end 112. One or more of the blocks of the example process of FIG. 3 may be implemented, for example, by one or more processors, including, for example, processor 114 of FIG. 1 or one or more quantum processors such as quantum processor 103 of FIG. 2. In some implementations, one or more of the blocks may be implemented apart from other blocks, and by one or more different processors or controllers. Further for explanatory purposes, the blocks of the example process of FIG. 3 are described as occurring in serial, or linearly. However, multiple blocks of the example process of FIG. 3 may occur in parallel. In addition, the blocks of the example process of FIG. 3 need not be performed in the order shown and/or one or more of the blocks of the example process of FIG. 3 need not be performed.

In the depicted example, at block 300, text-based input (e.g., a human-readable or quasi human readable text input) is received from a user such as a programmer at quantum compiler 110. The text-based input may be received via input/output components 118. The text-based input may include instructions or code for executing a quantum program on a quantum computer. For example, the text-based input may include sequences of alphanumeric characters and/or other text characters that form program code for the quantum computer.

At block 302, quantum compiler 110 generates a Hamiltonian that is executable by a quantum computer such as quantum computer 102 based on the human-readable text input. The Hamiltonian for a quantum program is represented, within quantum compiler 110 via a symbolic mathematical expression. For many quantum computers, the Hamiltonian generated by quantum compiler 110 will be a polynomial of binary variables. However, it should be appreciated that quantum compiler 110 is not limited to polynomial operations.

Additional functionality for the quantum computer is defined in the Hamiltonian, by the quantum compiler in response to text-based programmer input, by the addition of mathematical terms (each termed a phrase or Hamiltonian phrase herein for convenience) for each desired operation, constraint, assignment, comparison, or computation in such a way that: (i) the global minimum of the phrase occurs only when the values of qubits within the phrase satisfy the required functionality of the quantum program, (ii) all such valid qubit settings for that phrase result in the same global minimum energy, and (iii) all invalid qubit settings for that phrase result in a higher energy, though they need not be the same higher energy value.

For example, a programmer may use a keyboard or other input device of quantum compiler 110 to provide text-based input that includes text-based representations of a plurality of operations (e.g., variable definition operations, data input operations, constraint applications, assignment operations, comparison operations or other operations in a quantum program), each having one or more conditions (e.g., conditions specifying equality, inequality, particular values, conditional operations, etc. for quantum variables). Processing circuitry of quantum compiler 110 may generate the program Hamiltonian, at least in part, by generating a Hamiltonian phrase for each of the plurality of operations, in which each Hamiltonian phrase includes one or more qubit variables and has a global minimum that occurs when the one or more qubit variables have values that satisfy the one or more conditions of the corresponding operation. Each Hamiltonian phrase may also be arranged such that all valid qubit values (e.g., qubit values that satisfy the conditions of the operation) for that phrase result in the same global minimum energy, and such that all invalid qubit values (e.g., qubit values that do not satisfy the conditions of the operation) for that phrase result in a higher energy value for the Hamiltonian phrase, though they need not be the same higher energy value.

The functionality of the quantum program is created by quantum compiler 110 by the linear addition of these mathematical phrases, with optional weighting coefficients, such that the global energy minimum exists only when all phrases are simultaneously minimized, and thus all required functionality in the text-based input (e.g., the program code) has been satisfied. Quantum compiler 110 outputs a Hamiltonian expression whose ground eigenstates occur only for cases in which the qubit pattern therein satisfies all required functionality to form an executable QA/AQC program for execution by the quantum computer.

At block 304, the Hamiltonian may be provided from quantum compiler 110 to a front end such as QC front end 112 of a quantum computer, such as quantum computer 102. Providing the Hamiltonian from quantum compiler 110 to QC front end 112 may include sending the Hamiltonian via a local wired or wireless connection or over a network such as a local intranet or the Internet.

At block 306, front end 112 may configure a quantum processor such as quantum processor 103 of the quantum computer such that a low energy state of the quantum processor corresponds to a low energy state of the Hamiltonian. Configuring the quantum processor may include applying electromagnetic fields, voltages, and/or currents to qubits 104, couplers 106, and/or junctions 108 via processor interface circuitry 109.

At block 308, the quantum processor may be operated to achieve the low energy state. Operating the quantum processor to achieve the low energy state, may include slowly altering the active Hamiltonian of the quantum computer from an initial system in a known ground state corresponding to an initial Hamiltonian, $H_{initial}$, to that of the program Hamiltonian, $H_{final}$, over time, t, such that the quantum computer statistically reaches the ground eigenstate for the program-specific Hamiltonian by time T, via $$H(t) = \left(1 - \frac{t}{T}\right)H_{initial} + \frac{t}{T}H_{final} \quad \text{Equation (1)}$$

At block 310, qubit values of the quantum processor may be read out (e.g., using processor interface circuitry 109) while the quantum processor is in the low energy state.

At block 312, the output of the quantum program may be obtained based on the read out qubit values.

The operations described above in connection with blocks 300 and 302 or suboperations thereof may be performed any number of times to generate portions of the Hamiltonian corresponding to various inputs from the programmer. For example, the operations of blocks 300 and 302 may be performed to define quantum variables, to include input data, to specify functionality, and/or to optimize and/or simplify the Hamiltonian. FIGS. 4-7 show examples of operations that can be performed in association with blocks 300 and/or 302, to form a Hamiltonian for a quantum computer based on received text-based input from a programmer using quantum compiler 110.

Quantum compiler 110 may designate a meaning to a specific qubit, or an assemblage of qubits, to identify a variable for a quantum program. The native variable type of a QA and/or AQC Hamiltonian is the qubit. Quantum compiler 110 facilitates user definition, and optional description, of qubit variables by assigning a variable name that is unique within the scope of the program. The variable (e.g., a variable name and optional description) are tracked throughout the compilation of the program and assigned to a qubit by the compiler during an output generation stage. References to that variable, in assignment, access, comparison and other operations allow the construction of non-trivial portions of the Hamiltonian involving the state(s) of the qubit(s) defining the variable's implementation.

By tracking, with quantum compiler 110, the mapping of variable names to qubit assignments, later optimizations and simplifications can be performed by symbolic mathematical operations on the generated phrases within the Hamiltonian without explicit intervention by the programmer. In this way, quantum compiler can reduce the amount of human work required to generate efficient QA and/or AQC programs and increase the overall efficiency of the quantum computer itself and the quantum computing system.

Figure 4:
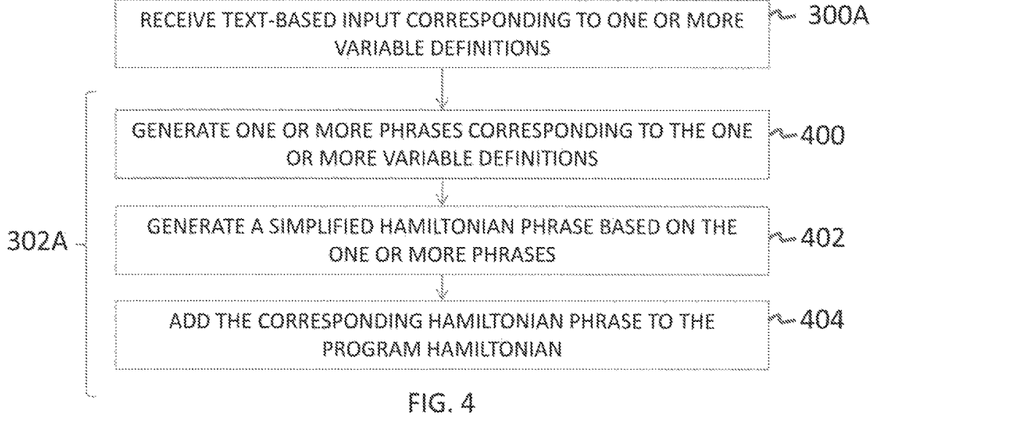
FIG. 4 is a flow chart showing an illustrative process for generating a Hamiltonian phrase based on text-based quantum variable definition inputs for quantum computing in accordance with certain aspects of the disclosure.

FIG. 4 depicts a flow diagram of an example process for quantum variable assignments, according to various aspects of the subject technology. In the example of FIG. 4, at block 300A (e.g., a portion of operation 300 of FIG. 3), text-based input corresponding to one or more variable definitions may be received at quantum compiler 110. For example, a programmer may input three qubit variables A, B, and C and associated assignments, using text-based inputs A=B and B=C.

At block 400, quantum compiler 110 may generate one or more Hamiltonian phrases corresponding to the one or more text-based variable definitions. For example (e.g., in a system with polynomial energy functions), quantum compiler 110 may generate the desired assignments by generating corresponding Hamiltonian phrases A+B−2AB and B+C−2BC respectively. Accordingly, in some scenarios, a text-based input equating first and second quantum variables (A and B) may cause quantum compiler 110 to generate a Hamiltonian phrase that includes a sum and a product of the first and second quantum variables. The product may be multiplied by factor (e.g., 2) as in the phrases above so that the minimum of the Hamiltonian phrase occurs when the condition (e.g., A=B) specified in operation defined by the text-based input is satisfied.

At block 402, quantum compiler 110 may generate a simplified Hamiltonian phrase based on the one or more phrases. For example, quantum compiler 110 may perform symbolic manipulation of the phrases for the combination and simplification in the overall Hamiltonian for text-based inputs A=B and B=C to a Hamiltonian form a simplified phrase such as A+2B+C−2AB−2BC.

At block 404, the Hamiltonian phrase may be set as an initial Hamiltonian for a desired program (e.g., if the Hamiltonian phrase is the first phrase of the Hamiltonian) or may be added to an existing program Hamiltonian (e.g., by quantum compiler 110). The operations associated with blocks 400, 402, and 404, in combination, may be a process 302A (e.g., a portion of operation 303 of FIG. 3) for generating at least a portion of an executable Hamiltonian for quantum computer 102.

Composite quantum variables, composed of multiple qubits, may be also defined using quantum compiler 110. There are two primary types of composite quantum variables, loosely-couple collections of quantum variables (e.g. lists of independent qubits) and tightly-coupled collections of quantum variables (e.g., in which operations are only meaningfully performed on the collection as a whole, such as a collection of qubits within a quantum byte).

Tightly-coupled composite quantum variables are useful for arithmetic operations, counting, etc. The number of bits used for a particular composite quantum variable may be specified at the time of declaration while not being intrinsically limited by the language or compiler. Quantum compiler 110 may provide common sizes by default. For example, quantum compiler may provide a quantum byte (qubyte) variable type that consists of an ordered collection of 8 qubits, representing integer values from 0 thru 255, inclusive. As another example, a quantum integer (quint) variable type may be provided that consists of an ordered collection of 32 qubits, representing integer values from 0 thru $2^{32}-1$, inclusive.

Figure 5:
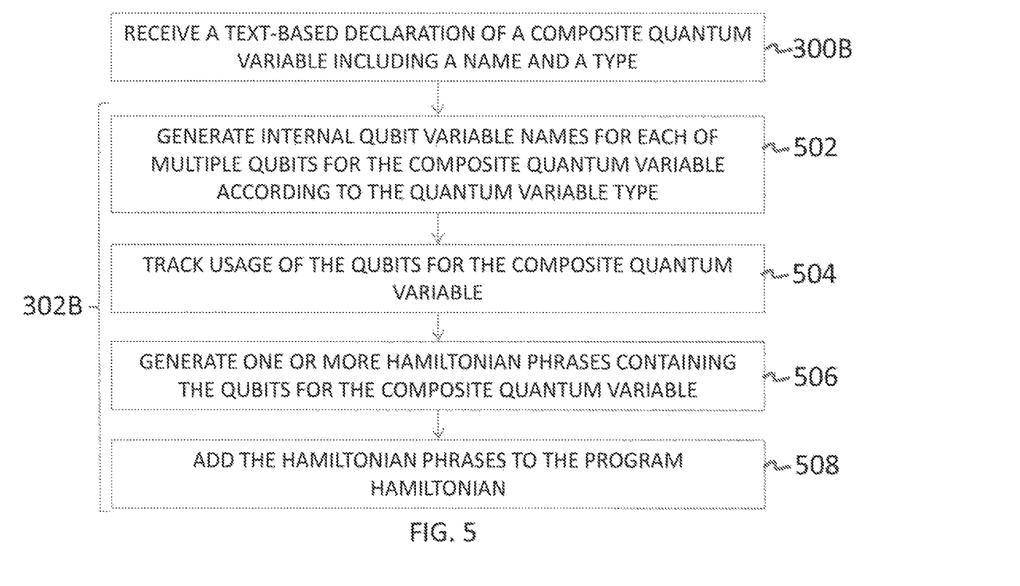
FIG. 5 is a flow chart showing an illustrative process for generating a Hamiltonian phrase based on a text-based declaration of a composite quantum variable for quantum computing in accordance with certain aspects of the disclosure.

FIG. 5 depicts a flow diagram of an example process for composite quantum variable assignments, according to various aspects of the subject technology. In the example of FIG. 5, at block 300B (e.g., a portion of operation 300 of FIG. 3), quantum compiler 110 may receive a text-based declaration of a composite quantum variable including a name and a type for the composite quantum variable. For example, quantum compiler 110 may receive a declaration of a composite quantum variable that consists of a specification of a variable type (e.g. a qubyte variable type or a quint variable type), a variable name unique within the program, and an optional description. Quantum compiler 110 tracks the type, name, and description of each declared composite variable.

At block 502, quantum compiler 110 may generate internal qubit variable names for each of multiple qubits for the composite quantum variable according to the quantum variable type. For example, quantum compiler 110 may generate, for each qubit within the composite quantum variable, a compiler-internal identifying variable name unique within the program. These names and qubit assignments are generated by the compiler during the processing of the program, rather than being specified by the user.

At block 504, quantum compiler 110 may track usage of the qubits for the composite quantum variable. For example, quantum compiler 110 tracks the usage of the qubits within the Hamiltonian. At block 506, quantum compiler 110 may generate one or more Hamiltonian phrases containing the qubits for the composite quantum variable. For example, functionality for the quantum program, involving composite quantum variables within the program (e.g. counting functionality) is translated into multiple Hamiltonian phrases involving the constituent qubits by the compiler.

At block 508, the Hamiltonian phrases are added to the program Hamiltonian. The operations associated with blocks 502, 504, 506, and 508, in combination, may be a process 302B (e.g., a portion of operation 302 of FIG. 3) for generating at least a portion of an executable Hamiltonian for quantum computer 102.

The types of functionality supported for a composite quantum variable are dependent upon the type of variable. For example, integer mathematical operations are supported for qubyte and quint variable types. Quantum compiler 110 may prevent invalid operations requested by the programmer from becoming part of a quantum program.

Figure 6:
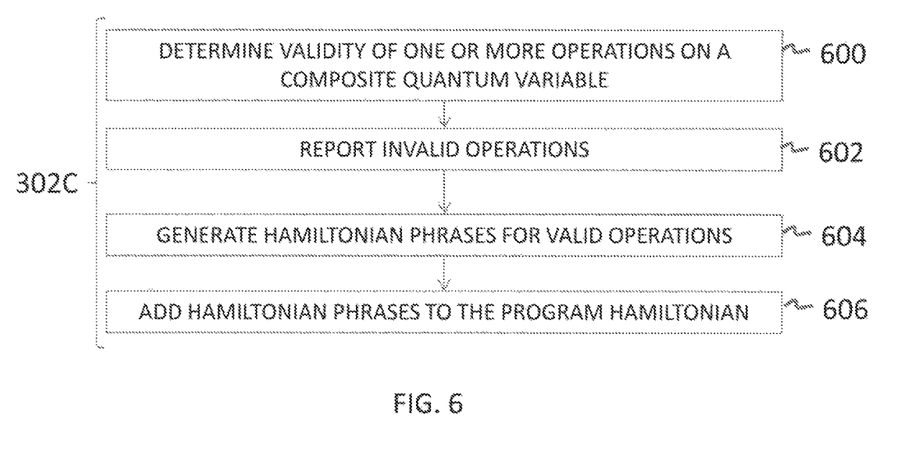
FIG. 6 is a flow chart showing an illustrative process for generating a Hamiltonian phrase for quantum computing in accordance with certain aspects of the disclosure.

FIG. 6 depicts a flow diagram of an example process for preventing invalid operations requested by the programmer from becoming part of a quantum program, according to various aspects of the subject technology. In the example of FIG. 6, at block 600, quantum compiler 110 may determine the validity of one or more operations input by a programmer based on the declared variable type of the composite quantum variables within the operations. One or more invalid operations and/or one or more valid operations on the composite quantum variables may be identified. For example, a programmer may provide text-based input requesting a non-integer operation with a quint variable. Quantum compiler 110 may recognize the non-integer operation and identify the operation as invalid due to the quint variable.

At block 602, quantum compiler 110 may report invalid operations to the programmer (e.g., by providing a warning or error message using a display).

At block 604, quantum compiler 110 may generate one or more Hamiltonian phrases for the valid operations, using one or more of the processes described herein.

At block 606, quantum compiler 110 may add the generated Hamiltonian phrases to the program Hamiltonian. As shown in FIG. 6, the operations of blocks 600, 602, 604, and 606 may be performed as a portion 302C of the operations of block 302 of FIG. 3.

FIGS. 4-6 illustrate various exemplary operations that may be performed by quantum compiler 110 for generating portions of a Hamiltonian for a quantum program (e.g., as portions of the operations associated with block 302 of FIG. 3, responsive to the receipt of text-based input from a programmer at block 300). Quantum compiler 110 may also generate portions of the program Hamiltonian based on data input from the programmer and/or specification of functionality for the program. Specification of functionality may include direct phrase specification, specification of constraints, specification of comparisons, specifications of branching, specifications of looping, specifications of subroutines, and/or specifications of tabular data (as examples).

With respect to data input for a quantum program, it should be noted that conventional digital computing platforms typically follow a sequence of instructions, which allows for the dynamic specification of input from external sources (e.g., reading files from storage, prompting the user to respond via keyboard/mouse, etc.). In contrast, because QA and/or AQC systems such as quantum processor 103 operate on a single program Hamiltonian at a time, inputs for a given Hamiltonian instance are specified in the Hamiltonian itself (or comparable hardware implementation, as applicable).

Unlike the conventions in digital computer programs, quantum variables are not, in general, initialized to specific values—indeed, it is the unset nature of these variables that allow the quantum annealing to find the proper qubit values. However, in some scenarios, variables which are initialized to specific values as the data input to the program may be specified.

Responsive to receiving text-based input defining real-valued initialization of qubits by specification of the value of 0 or 1 for a given defined variable (e.g., text-based inputs of A=0 and/or B=1), quantum compiler 110 maintains a list of such known qubit settings for later algebraic symbolic simplification.

Responsive to receiving text-based input defining composite quantum variables (e.g. qubytes), quantum compiler 110 determines the qubit settings for each constituent qubit of the composite variable based on the appropriate composite functionality. For example, quantum compiler may receive text-based input specifying assignment of a non-trivial integer value to quantum integer C (e.g. text-based input C=12). Responsively, quantum compiler 110 may assign the value of constituent qubits to represent the quantum integer C via Equation 2 below.

$$C = \Sigma_n 2^n C_n \qquad \text{Equation (2)}$$

Thus, the constituent qubits $C_n$ are set by quantum compiler 110 via bitwise assignment corresponding to the binary representation of the assigned number. In the example of C=12, with 12 represented in binary as $1100_2$, quantum compiler assigns and tracks the values: $C_3=1$, $C_2=1$, $C_1=0$, and $C_0=0$ for qubits $C_3$, $C_2$, $C_1$, and $C_0$.

Following generation of all phrases for the program Hamiltonian, initialized values may be used by quantum compiler 110 to simplify the Hamiltonian, as discussed in further detail hereinafter.

During compilation, quantum compiler 110 generates, as needed, additional qubit-based ancillary variables to represent intermediate results or to modify or generate Hamiltonian phrases specific to target hardware of the particular quantum processor. When an ancillary qubit is generated, quantum compiler 110 will generate a variable name for each ancillary qubit unique within the program. Quantum compiler 110 may optionally generate a variable description where applicable. Quantum compiler 110 tracks and manipulates generated ancillary variables along with other variables within the quantum program.

A generated ancillary variable may be a single qubit (e.g. representing the result of a logical Boolean operation on two qubits), or a composite quantum variable (e.g. representing an intermediate sum of quantum integers in a complex arithmetic function). The type of the generated variable is determined by quantum compiler 110 based on the functionality specified in the text-based input.

With respect to the specification of functionality for a quantum program, whereas digital computers typically specify a sequence of instructions, all functionality within a quantum program such as a QA and/or AQC program is defined by the mathematical phrases within a Hamiltonian.

As noted above, quantum compiler 110 may generate portions of a program Hamiltonian based on direct phrase specification by a programmer. For example, in some scenarios, a programmer may wish to explicitly define a mathematical phrase for inclusion in the program Hamiltonian, based on the defined quantum variables. Quantum compiler 110 may include an append function, which when received from a programmer with a programmer-specified phrase, causes the compiler to add the programmer-specified phrase to the program Hamiltonian.

More particularly, quantum compiler 110 may construct one or more phrases for the program Hamiltonian (depending on whether the user-specified variables are simple qubits or composite quantum variables) and append the phrase(s) to the program Hamiltonian.

For example, the append function may be used for specification of bonus and/or penalty terms for the state of a given qubit. For example, to assign a penalty of 10 energy units to solutions where the qubit A is set to 1, a programmer may provide a direct phrase specification of "append 10A" to quantum compiler 110. Responsive to receiving the "append 10A" input, quantum compiler 110 may append a polynomial term "10A" to the program Hamiltonian.

In this manner, all possible Hamiltonians for a given system can be constructed. Thus, the append function can be provided as the universal building block of QA/AQC Hamiltonians.

However, for complex problems, the append function may not be an efficient means of crafting Hamiltonians, and quantum compiler 110 may be configured to provide other functions for a programmer that can be input using text (e.g., human readable or quasi human readable text) to cause quantum compiler 110 to generate Hamiltonian phrases for the program Hamiltonian.

For example, quantum compiler 110 may generate Hamiltonian phrases for Boolean operations on qubits and qubit-based variables. For example, quantum compiler 110 may generate Hamiltonian phrases for binary operations on qubits such as AND, OR, XOR, NAND, and NOR operations, including assignment of the result to another qubit (e.g. responsive to a text-based input of C=A XOR B, specifying that quantum variable C is equal to the XOR of quantum variables A and B).

Quantum compiler 110 may generate Hamiltonian phrases for operations on appropriate types of tightly-coupled composite quantum variables (e.g. qubytes), which are bitwise binary operations on the constituent qubits, including assignment of the result to another corresponding composite variable.

Quantum compiler 110 may generate Hamiltonian phrases for N-ary operations on qubits, such as terms appearing in satisfiability problems (e.g. A OR B OR C OR D), including assignment of the result to another qubit. Hamiltonian phrases for N-ary operations may be generated by an automated pairwise binary reduction of the terms, with intermediate results assigned to generated ancillary qubits by quantum compiler 110.

Quantum compiler 110 may generate Hamiltonian phrases for unary operations on qubits, (e.g., negation), including assignment of the result to another corresponding qubit variable (e.g., A=NOT B).

As another example, quantum compiler 110 may generate Hamiltonian phrases for various constraints. Constraints are directives that specify the value of one or more qubits with regard to a computation based on one or more other qubits, whether that computation is logical or mathematical.

One example constraint is qubit assignment, in which a phrase is generated whose energy minimum is met if and only if the 2 qubits have the same value. The syntax for the text-based input of such a constraint may, for example, be A=B. Quantum compiler 110 may generate, (e.g., in polynomial Hamiltonian systems) a Hamiltonian phrase A+B−2 AB to implement the constraint according the input A=B.

For composite quantum variables, a corresponding phrase for each constituent qubit is generated by quantum compiler 110.

It is often desirable to create phrases enforcing a constraint on a given calculation, such that the solution qubit pattern will fulfill a given condition. For example, a programmer may desire to include a constraint that a given N-ary Boolean problem will result in a positive answer, (e.g. for qubit variables A, B, C, and D; A OR B OR C OR D=True).

Quantum compiler 110 may provide a programmer with the ability to input constraints by supporting subroutines that generate phrases (and ancillary variables, if needed) implementing the desired functionality. A variety of convenience directives of this type are provided by quantum compiler 110, and the user may be provided, by quantum compiler 110, with the ability to define additional directives as subroutines.

Example directives that may be provided by quantum compiler 110 (and which may be called using predetermined text-based input as noted below) include:

Exactly_N <list of qubits>, which, when compiled by quantum compiler 110, causes creation of a Hamiltonian phrase whose energy is minimized when N of the listed qubits in <list of qubits> are set to 1;

One_Or_More <list of qubits=, which, when compiled by quantum compiler 110, causes creation of a Hamiltonian phrase whose energy is minimized if at least one of the listed qubits in <list of qubits> is set to 1;

Zero_Or_One <list of qubits>, which, when compiled by quantum compiler 110, causes creation of a Hamiltonian phrase whose energy is minimized if fewer than two of the listed qubits in <list of qubits> are set to 1; and Bits_On counter <list of qubits>, which, when compiled by quantum compiler 110, causes creation of a Hamiltonian phrase whose energy is minimized if the quantum integer counter represents the number of bits set to one from the listed qubits in <list of qubits>.

In each of the above example directives, quantum compiler 110 examines the logic to determine whether a unique solution is specified by the number of qubits listed. If so, then the state of that qubit is recorded (e.g., in memory 116) for later simplification—in the same manner that qubits initialized as part of the data input process are recorded by the compiler.

Quantum compiler 110 may apply a weight to various constraint phrases to ensure mathematical self-consistency within the program Hamiltonian. For example, quantum compiler may algebraically multiply one or more Hamiltonian phrases by a user-specified, or compiler-generated weight factor greater than 1.0. Quantum compiler 110 may provide a programmer with the ability to specify constraint weight factor, which may vary by constraint type, via input of text-based directives in the program code, such as "Set constraint_factor 2.5" to set a weight factor named "constraint_factor" to a value of 2.5.

As another example, quantum compiler 110 may generate Hamiltonian phrases for various comparisons of quantum variables, whether qubits or composite quantum variables. Quantum compiler 110 may assign the result of a comparison to one or more other qubits.

For example, quantum compiler 110 may facilitate comparisons of equality for qubit variables by providing a result of True, if and only if the two qubits compared have the same value, and providing a result of False otherwise. Comparisons of equality for composite quantum variables are also provided by quantum compiler 110 as the logical AND of the corresponding bitwise equality comparison of all constituent qubits. For example, quantum compiler 110 may generate a combination (e.g., the logical AND) of Hamiltonian phrases for the bitwise equality comparisons of the constituent qubits of the composite quantum variables.

As an example, to assign the comparison of qubit variables A and B to qubit C, (e.g., responsive to receiving the text-based programmer input C=(A=B)), quantum compiler 110 may generate, a Hamiltonian phrase (for polynomial Hamiltonian systems) of 2AB−A−B−C+2AC+2BC−4ABC.

Comparisons of inequality (e.g., greater-than comparisons and less-than comparison) for qubits are similarly constructed and can be assigned to other qubits. For comparisons of inequality for composite quantum variables, the validity of the comparison depends on the type of quantum variable. For loosely-coupled quantum variable types such as lists and tables, the comparison may not be defined and quantum compiler 110 may indicate an error. However, for composite quantum variable types representing ordered quantities such as integers and strings, inequality comparisons may be handled by quantum compiler 110 by generating a Hamiltonian phrase based on the ordering of the composite quantity. For example, responsive to text-based input such as A=(X>Y), two quantum integers may be compared and the result stored in a qubit, (e.g. for quantum integers X and Y, quantum compiler 110 may generate a Hamiltonian phrase in which the value of A is 1 (True) if and only if X is greater than Y, and 0 (False) otherwise). For example, for A=(X>Y), quantum compiler 110 may generate the Hamiltonian phrase by bitwise comparisons of equality/order of the constituent qubits in the quantum integers and generation of appropriate ancillary qubits for each bitwise comparison as describe above.

As another example, quantum compiler 110 may generate Hamiltonian phrases for various branching operations. Although the concept of branching may seem unintuitive, given the non-sequential nature of QA/AQC Hamiltonian generation, it is possible by the use of ancillary variables. A branching structure is defined as a series of logical conditions and subsets of functionality which are to be performed only if the appropriate conditionals are satisfied. For example, a branching operation may be defined by a text-based input of:
if (condition 1)
then
perform functionality-set-1
else if (condition 2)
then
perform functionality-set-2

For QA/AQC systems, the evaluation of conditional expressions may be performed using the Hamiltonian phrases described above in connection with Boolean operation and constraints For example, each conditional expression may be reduced by quantum compiler 110 and assigned to a single conditional value qubit such as an ancillary qubit generated by quantum compiler 110.

Each functionality set may then be compiled into a set of Hamiltonian phrases and linearly combined into a single functionality branch Hamiltonian phrase. Each functionality branch phrase may then be multiplied by a combination of the conditional value qubits to implement the desired branching logic. For example, in the order defined in the text-based input for the branching, the functionality branch Hamiltonian phrase is multiplied by the corresponding conditional value qubit for each condition that must be met, and by the negated value of the corresponding conditional value qubit for each condition that must not be met, for that branch. The results of each branch are then linearly combined to form the branch Hamiltonian phrase for the entire branch structure.

As an example, the text-based branching input shown above may be implemented into a program Hamiltonian by generating a branch Hamiltonian phrase of $C_1$*phrase$_1$+(1−$C_1$)*$C_2$*phrase$_2$, where a qubit $C_1$ holds the value of the first conditional expression (condition 1), $C_2$ holds the value of the second conditional expression (condition 2), phrase$_1$ is the functionality phrase for branch 1 (e.g., the "if" branch above), and phrase$_2$ is the functionality phrase for branch 2 (e.g., the "else if" branch above), and such that phrase$_1$ contributes to the final Hamiltonian if condition 1 is satisfied and phrase$_2$ contributes only if condition 1 is not satisfied but condition 2 is satisfied. In this manner, branching of arbitrary complexity may be constructed by quantum compiler 110.

As another example, quantum compiler 110 may generate Hamiltonian phrases for various looping operations. Because a quantum variable has a single observable value in the ground eigenstate of the problem Hamiltonian, it is not possible for a given variable to assume multiple values within a Hamiltonian—such as is common for the loop iterators in conventional digital programming languages. Accordingly, quantum compiler 110 may provide a programmer with the capability to input fixed-iteration loops by explicitly unrolling the loop structure into a sequence of Hamiltonian phrases which are then linearly combined to form a single phrase representing the functionality of the entire loop structure.

As another example, quantum compiler 110 may generate Hamiltonian phrases for various subroutines. Quantum compiler 110 may store various pre-defined utility declarations and may provide a programmer with the ability to define additional declarations as subroutines. For QA/AQC Hamiltonian generation, a subroutine is a defined expression in which the programmer specifies quantum variables, and that returns a Hamiltonian phrase implementing the desired functionality of the subroutine.

Within a given subroutine, the names of variables are representational only, as opposed to other variables which are unique within a given program, and are mapped by quantum compiler 110 to the arguments of the subroutine when the subroutine is called.

The functionality contained within a subroutine may be built from any other capability provided by the compilers, and may call other subroutines. Any ancillary variables generated by quantum compiler 110 are created from a global ancillary variable list stored by the compiler to ensure program-wide uniqueness of variable naming. Quantum compiler 110 tracks of the mapping of qubit variables, such that the final generated Hamiltonian phrase is expressed solely in terms of user-specified variables and any generated ancillary variables for the subroutine. The Hamiltonian phrase for the subroutine is then weighted by a multiplicative factor, if applicable, and appended to the problem Hamiltonian. In this way, quantum compiler 110 may allow repetitive tasks to be efficiently defined by a programmer for a quantum computer.

As another example, quantum compiler 110 may generate Hamiltonian phrases for tabular data. Loosely-coupled composite quantum variables, such as lists, tables, and arrays (referred to generally as tables hereinafter), may be constructed using quantum compiler 110. In this way, the human effort in program creation may be reduced by providing higher-level design patterns for the programmer. Quantum compiler 110 supports input and use of tables, including defining, accessing, and setting the member values of the tables. However, because of the non-sequential nature of the QA/AQC Hamiltonian solution, the value of entries in such tables has the same nature as all quantum variables.

Quantum compiler 110 will automatically assign constituent qubits for defined quantum tables. The values within the tables may be defined in the program (e.g. data initialization) or computed during processing. For values defined within the program code, the assignment of the values is the same as for any qubit or tightly-couple composite type, as described herein.

Table values defined by computation require that both the index and the value be specified. The Hamiltonian phrase to assign a value to a given index depends on whether the index is also a variable or is specified in the program code.

In some cases, a table index is specified in the text-based program code input. For example, the text-based program code input may include T[4]=x, to define the fourth index of a table T to be a variable x. Quantum compiler 110 may uniquely identify the constituent qubit(s) of the table and craft the Hamiltonian phase as with any other assignment.

However, if the table index is also a quantum variable (e.g. a quantum integer), quantum compiler 110 performs Hamiltonian phrase generation such that both the index and value are properly matched. For example, given a quantum table T, and quantum index Y and a quantum value X, the text-based assignment T[Y]=X can be implemented by quantum compiler 110 by generating the Hamiltonian phrase:

$$\Sigma_i[(X-T[i])^2+(Y-i)^2] \quad \text{Equation (3)}$$

where the summation is over all table indices, i.

Due to the symmetric nature of the Hamiltonian phrases for tabular access, the same phrases generated for implementation of tables are used in accessing tables. For example, the same phrase shown above in Equation (3) is also used to implement X=T[Y].

To best utilize the qubit resources of quantum computer 102, quantum compiler 110 may advantageously perform arithmetic simplification of the program Hamiltonian prior to output generation. However, this is an optional step and may be disabled by a directive to the compiler.

Figure 7:
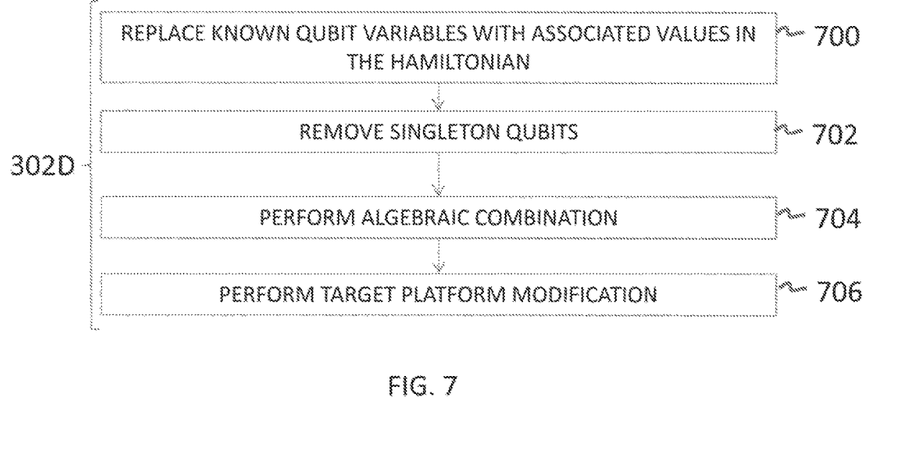
FIG. 7 is a flow chart showing an illustrative process for simplifying a program Hamiltonian for quantum computing in accordance with certain aspects of the disclosure.

FIG. 7 is a flow chart of illustrative simplification operations that may be performed by quantum compiler 110 in scenarios in which Hamiltonian simplification is enabled. The operations of FIG. 7 may be performed as a portion of the operations of block 302 of FIG. 3 in a simplification process 302D.

At block 700, known qubit variables (e.g., qubit variables with known values stored by quantum compiler 110) may be replaced with associated values (e.g., the known values stored by quantum compiler 110) in the Hamiltonian. Known qubit variables may have values that are known from a data initialization input and/or from a simple logical constraint. For example, a list of known qubits having values of zero and one may be maintained by quantum compiler 110 during the processing of the program code and may used to simplify the Hamiltonian by symbolic substitution. In one particular exemplary scenario, quantum compiler may store, during compilation, a Hamiltonian, H, where H=A+B+2 AC−BC and may store a known value of one for variable A. During the operations of block 700, the Hamiltonian is then reduced to H=1+B+2 C−B C by setting the value of A to 1.

At block 702, quantum compiler 110 may remove one or more singleton qubits from the Hamiltonian. Singleton qubits may be qubits that have no interactions with other qubits in the Hamiltonian and whose state may therefore be computed from the single term in which they do appear, the state being determined exactly by considering the two states of the term in which the qubit appears and selecting the state that gives the lower energy. As an example, for polynomial Hamiltonians, the state will be zero for a Hamiltonian term with a positive coefficient and the state will be one for a term with a negative coefficient.

At block 704, algebraic combination of terms within the Hamiltonian may be performed. For example, a quantum program may cause quantum compiler 110 to generate a program Hamiltonian with one or more terms that cancel (e.g. a polynomial term with a coefficient of zero). These terms that cancel are removed from the Hamiltonian at block 704, as they cannot impact the computation.

At block 706, one or more modifications may be made, by quantum compiler 110, to the program Hamiltonian, for implementation on a target platform (e.g., a specific quantum computer or specific type of quantum computer) with known platform attributes (e.g., the number of qubits, couplers, and/or junctions of the quantum computer). The platform attributes may be stored by quantum compiler 110 and may be programmer-provided or quantum compilers 110 may store one or more platform attribute sets for one or more corresponding platforms. Platform attribute sets may be selectable by a programmer (e.g., from a drop down list provided by quantum compiler 110 or by including a call to a known attribute library in the program code). In order to modify the program Hamiltonian for a target platform, quantum compiler 110 may perform automated polynomial order reduction, Hamiltonian partitioning into disjoint phrases, and qubit splitting (as examples).

Quantum compiler 110 may provide an output that can be used to configure quantum computer 102 to execute the desired program. The output of the compiler includes a mathematical description of the Hamiltonian and a delineation of the qubit definitions (e.g., user-defined qubits and compiler-generated qubits). Those qubits whose values were determined during the optimization and simplification stage may be reported in the output without including those values output Hamiltonian.

Depending on the targeted quantum hardware, the representation of the Hamiltonian in the compiler output may be a symbolic algebraic expression (e.g. a polynomial) or a matrix (e.g. for programs for solving quadratic unconstrained binary optimization (QUBO) problems with a quantum computer implemented a quantum annealer).

Quantum compiler 110 may generate the output in a format that is provided to compiler using text-based commands within the program file. For example, quantum compiler 110 may provide the output based on text-based user directives such as the name of an output file containing the representation of the constructed Hamiltonian, the name of an output file containing variable name to Hamiltonian qubit identifications, the maximum polynomial order of terms to be output, and/or the partitioning of the Hamiltonian into sub-equations of disjoint qubit interactions.

The systems, devices, and methods described herein provide a functionally complete programming system, meaning that all possible Hamiltonians for quantum computer 102 (e.g., a QA/AQC system) can be constructed by quantum compiler 110.

In accordance with various aspects of the subject disclosure, quantum compiler 110 may, during compilation of a quantum program, generate of Hamiltonian phrases from text-based programmer input, each phrase expressing a specified assignment, comparison, logical operation, mathematical operation, constraint, arbitrary weighting, or other operation, to represent a subset of the total problem Hamiltonian equation.

In accordance with various aspects of the subject disclosure, quantum compiler 110 may provide a programmer with the ability to input data values, variable definitions, and variable descriptions as text, allowing legibility for human users of the system.

In accordance with various aspects of the subject disclosure, quantum compiler 110 may, during compilation operations, automatically generate and track one or more ancillary qubit variables, as needed, to generate Hamiltonian phrases corresponding to the text-based programmer input.

In accordance with various aspects of the subject disclosure, quantum compiler 110 may perform automatic assignment of qubits to logical variables (e.g., for raw qubits and/or composite quantum variables), including automated tracking of those logical variables throughout the symbolic manipulations in assembling the program Hamiltonian from the many Hamiltonian phrases and to the output.

In accordance with various aspects of the subject disclosure, quantum compiler 110 may provide a programmer with the ability to define and utilize one or more composite quantum variable types (e.g., qubyte type variables, quint type variables, etc.), by performing automatic decomposition of composite quantum variables into constituent qubits and subsequent tracking and manipulation of those qubits in the construction of Hamiltonian phrases in the program Hamiltonian.

In accordance with various aspects of the subject disclosure, quantum compiler 110 may provide a programmer with the ability to define and utilize indexed composite quantum variable types, such as lists, arrays, and tables in which the variable type and/or the index may be quantum variables or non-quantum variables. Defining and utilizing indexed composite quantum variable types may include accessing, assignment, comparison, and operation on the data elements.

In accordance with various aspects of the subject disclosure, quantum compiler 110 may provide a programmer with the ability to define operations on composite quantum variable types, such as mathematical operations (e.g. multiplication) on quantum integers, by generating Hamiltonian phrases for the mathematical operations on the composite quantum variables based on Hamiltonian phrases for the constituent qubits of the composite quantum variables.

In accordance with various aspects of the subject disclosure, quantum compiler 110 may provide a programmer with the ability to define branching operations, even in a quantum computing system in which sequential operations may not be possible, by replicating the branching capability by generating composite Hamiltonian phrases from Hamiltonian phrases representing conditional variables and dependent operations as described herein.

In accordance with various aspects of the subject disclosure, quantum compiler 110 may perform automatic symbolic simplification of a program Hamiltonian by performing operations such as removing variables whose value is uniquely determined by the structure of the Hamiltonian and storing those values for output, to produce an efficient expression of the quantum program and/or by performing other operations such as those operations described above in connection with FIG. 7.

In accordance with various aspects of the subject disclosure, quantum compiler 110 may provide a programmer with the ability to define subroutines (e.g., repeatable templated constructs) to facilitate phrase generation based on defined behaviors and rules for a list of specified quantum variables.

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially" and "approximately" may provide an industry-accepted tolerance for their corresponding terms and/or relativity between items. Such an industry-accepted tolerance may range from less than one percent to ______ percent.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

What is claimed is:

1. A quantum compiler, comprising:
   memory; and
   processing circuitry communicatively coupled to the memory, the processing circuitry configured to:
   receive a text-based input from a user, the text-based input comprising code for a quantum computer; and
   providing the user ability to input various constraints by supporting subroutines that generate various constraint phrases implementing desired functionality;
   generate a program Hamiltonian that is executable by a quantum computer, based on the text-based input, wherein functionality of the quantum computer is defined in the program Hamiltonian;
   wherein the text-based input comprises text-based representations of a plurality of operations, each having one or more conditions;
   generate the program Hamiltonian by the processing circuitry at least in part, by:
   generating a Hamiltonian phrase for each of the plurality of operations, wherein each Hamiltonian phrase includes one or more qubit variables and has a global minimum that occurs when the one or more qubit variables have values that satisfy the one or more conditions of the corresponding operation; and
   appending the Hamiltonian phrase for each of the plurality of operations to the program Hamiltonian;
   applying weights to the various constraint phrases to ensure mathematical self-consistency within the program Hamiltonian;
   optimize the generated Hamiltonian phrase by tracking mapping variable names to qubit assignments and performing symbolic mathematical operations of the generated Hamiltonian phrases;
   modify the program Hamiltonian for implementation on a target platform;
   output a mathematical description of the program Hamiltonian and a delineation of the qubit definitions determined during optimization, wherein the qubit definitions are at least one of user defined or compiler defined; and
   provide the output to a quantum computer for execution.

2. The quantum compiler of claim 1, wherein the one or more qubit variables of at least one of the Hamiltonian phrases includes a user-defined qubit variable and a compiler-generated ancillary qubit variable.

3. The quantum compiler of claim 1, wherein the text-based input comprises an assignment of a quantum table value, indexed in a table by a quantum variable, and wherein the processing circuitry is configured to generate the program Hamiltonian, at least in part, by:
   generating a Hamiltonian phrase that includes a summation over all indices of the table; and
   appending the Hamiltonian phrase to the program Hamiltonian.

4. The quantum compiler of claim 1, wherein the memory is configured to store one or more initialized values corresponding to one or more qubit variables and wherein the processing circuitry is configured to generate the program Hamiltonian, at least in part by replacing the one or more qubit variables in the program Hamiltonian with the one or more initialized values.

5. The quantum compiler of claim 1, wherein the memory comprises a plurality of addressable semiconductor-based bi-stable memory cells.

6. The quantum compiler of claim 1, wherein the processing circuitry comprises a field-programmable gate array.

7. The quantum compiler of claim 1, wherein the quantum computer comprises a plurality of qubits, a plurality of couplers, and a plurality of junctions that are influenced, during quantum computation, based on a plurality of qubit values, a plurality of weights, and a plurality of qubit coupling strengths in the program Hamiltonian.

8. The quantum compiler of claim 1, wherein the text-based input comprises a comparison of a first composite quantum variable with a second composite quantum variable, and wherein the processing circuitry is configured to generate the program Hamiltonian, at least in part, by:
generating a Hamiltonian phrase that is a combination of Hamiltonian phrases for a plurality of comparisons of a plurality of constituent qubits of the first composite quantum variable and the second composite quantum variable; and
appending the Hamiltonian phrase to the program Hamiltonian.

9. A method, comprising:
receiving a text-based input from a user, the text-based input comprising code for a quantum computer; and
providing the user ability to input various constraints by supporting subroutines that generate various constraint phrases implementing desired functionality;
generating a program Hamiltonian that is executable by a quantum computer, based on the text-based input, wherein functionality of the quantum computer is defined in the program Hamiltonian;
wherein the text-based input comprises text-based representations of a plurality of operations, each having one or more conditions;
generating the program Hamiltonian by a processing circuitry at least in part, by:
generating a Hamiltonian phrase for each of the plurality of operations, wherein each Hamiltonian phrase includes one or more qubit variables and has a global minimum that occurs when the one or more qubit variables have values that satisfy the one or more conditions of the corresponding operation; and
appending the Hamiltonian phrase for each of the plurality of operations to the program Hamiltonian;
applying weights to the various constraint phrases to ensure mathematical self-consistency within the program Hamiltonian;
optimizing the generated Hamiltonian phrase by tracking mapping variable names to qubit assignments and performing symbolic mathematical operations of the generated Hamiltonian phrases;
modifying the program Hamiltonian for implementation on a target platform;
outputting a mathematical description of the program Hamiltonian and a delineation of the qubit definitions determined during optimization, wherein the qubit definitions are at least one of user defined or compiler defined; and
providing the output to a quantum computer for execution.

10. The method of claim 9, wherein the text-based input comprises at least one user-defined qubit variable.

11. The method of claim 9, wherein the text-based input includes text specifying that a first quantum variable is equal to a second quantum variable, and wherein generating the program Hamiltonian comprises generating a Hamiltonian phrase that includes an addition of the first quantum variable and the second quantum variable.

12. The method of claim 11, wherein the Hamiltonian phrase further comprises a product of the first quantum variable and the second quantum variable and wherein generating the program Hamiltonian comprises appending the Hamiltonian phrase to the program Hamiltonian.

* * * * *